Patented Feb. 24, 1948

2,436,710

UNITED STATES PATENT OFFICE 2,436,710

PREPARATION OF VINYL CHLORIDE

James A. Bralley, Akron, Ohio, assignor to The B. F. Goodrich Company, New York, N. Y., a corporation of New York No Drawing. Application November 9, 1944, Serial No. 562,741

6 Claims. (Cl. 260—656)

This invention relates to the preparation of vinyl halides such as vinyl chloride, vinyl bromide, etc., by the addition reaction of acetylene with a hydrogen halide, and pertains more specifically to a new catalyst for use in this reaction.

It has long been known that vinyl halides may be prepared by reacting acetylene with a hydrogen halide in the presence of various catalysts such as mercuric halides, bismuth trichloride, metallic mercury, or other similar materials.

I have now discovered a new catalyst which is highly effective, which overcomes the disadvantage of the earlier catalysts described above, and which possesses other and further advantages to be discussed hereinafter. The catalyst comprises as its essential component a trivalent arsenic compound in which at least one valence of the arsenic is satisfied with a beta-halovinyl group, the remaining valences being satisfied by halogen atoms. Among such compounds are beta-chlorovinyl dichloroarsine, bis-(beta-chlorovinyl) chloroarsine, tris - (beta - chlorovinyl) arsine, as well as the analogous bromine, fluorine, etc., compounds such as beta-bromovinyl dibromoarsine, bis-(beta-bromovinyl) bromoarsine, beta-fluorovinyl difluoroarsine, etc. These compounds may be prepared by the method of Lewis and Perkins, Industrial and Engineering Chemistry 15, 290 (1923), starting with the appropriate arsenic trihalide.

It is usually desirable to support these catalysts upon a surface-active material as a carrier when the reaction is to be carried out in the vapor phase. Among suitable carriers are activated charcoal, silica gel, diatomaceous earth, and other similar materials. The catalyst is usually deposited upon the carrier by dissolving the former in a suitable volatile solvent, pouring the solution over the carrier, and then removing the solvent. It has been found that the presence of even small amounts of water, alcohol, or other foreign substance in the reaction chamber causes side reactions which lead to the formation of undesired by-products. Inasmuch as it is practically impossible to remove all of the catalyst solvent from the carrier, the catalysts hitherto known which have generally been soluble only in water, alcohol, acetone, or the like have been disadvantageous in this respect. My new catalysts, however, are soluble in liquid vinyl chloride, vinyl bromide, or the like, so that when the catalyst is deposited upon the carrier from a solution in this solvent, the possibility of side reactions caused by the presence of foreign materials is completely eliminated.

The following specific examples are intended to serve as an illustration of the nature of my invention, and not as a limitation on the scope thereof.

Example I

A mixture of the three beta-chlorovinyl arsines was prepared according to the procedure of Lewis and Perkins, supra. A 7-gram portion of the fraction boiling from 124–150° C. at 27 mm. was dissolved in 400 cc. of liquid vinyl chloride. The solution was then poured over 540 cc. of activated charcoal, and most of the solvent was allowed to evaporate at room temperature. Most of the remaining vinyl chloride was removed by heating the material at 60° C. for two and one-half hours at reduced pressure. The catalytic material was then placed in a catalyst tube maintained at about 200° C. and a mixture of about 1 part by volume of acetylene and 1.1 parts by volume of hydrogen chloride was passed through the apparatus. Vinyl chloride of high purity, after removal of the excess hydrogen chloride, was obtained in excellent yield.

Example II

A solution of 33.5 grams of mercuric chloride in 300 cc. of methanol was poured over 1000 cc. of activated charcoal. The excess of methanol was then removed by heating the material at 65° C. at reduced pressure. After cooling, a solution of 32 grams of mixed beta-chlorovinyl arsines, prepared as in Example I, in 400 cc. of liquid vinyl chloride was poured over the catalyst carrier. The excess of vinyl chloride was then removed by heating at reduced pressure. This catalyst was found to be effective in producing vinyl chloride in good yield from a mixture of acetylene and hydrogen chloride at a temperature of about 100° C. At somewhat higher temperatures, the yield of vinyl chloride was over 99% of the theoretical amount. This may be compared with yields of 65 to 70% of the theoretical when mercuric chloride alone is used on activated charcoal at temperatures in the neighborhood of 200° C.

Similar excellent results are obtained in the synthesis of vinyl bromide or other vinyl halide from acetylene and the appropriate hydrogen halide in the presence of other catalysts within the scope of this disclosure, such as beta-bromovinyl dibromoarsine, bis - (beta - fluorovinyl) fluoroarsine, etc.

The catalysts of this invention may be used individually, e. g., beta-chlorovinyl dichloroarsine, bis-(beta-chlorovinyl) chloroarsine, or tris-(beta-chlorovinyl) arsine alone, as well as in mixtures with each other or with other known catalysts as described in the examples above. Excellent results are also obtained by using mixtures of these arsenic compounds with the beta-halovinyl mercury compounds described in my copending application Serial No. 562,742.

The reaction may be carried out in solution if desired, for example in a suitable organic solvent, although best results have been obtained in the vapor phase.

The precise amount of my new catalyst employed is not critical, even minute quantities having an appreciable effect upon the reaction. Similarly, the temperature at which the reaction is carried out is not critical, although there is no particular advantage in using temperatures above about 200° C. The acetylene and hydrogen chloride may be used in varying proportions; however, it is usually preferred to employ a slight excess of hydrogen chloride, because this material is more readily removed from the product than is an excess of acetylene.

Inasmuch as catalyst tubes or reaction chambers constructed of iron or steel are the cheapest and most commonly used for this reaction when it is carried out in the vapor phase, it has heretofore been impossible to reactivate the catalyst after exhaustion without removing the carrier completely from the reaction chamber. Solutions of catalytic materials hitherto known have generally been so corrosive to iron or steel that the carrier, after being immersed in the solution of catalyst, necessarily was dried as completely as possible before being introduced into the catalyst tube. Solutions of my new catalysts, however, are completely non-corrosive to iron or steel, so that the necessity for removing the catalyst and carrier from the reaction chamber for reactivation is eliminated.

Although I have herein disclosed specific embodiments of my invention, I do not intend to limit myself solely thereto, but to include all of the obvious variations and modifications falling within the spirit and scope of the appended claims.

I claim:

1. The process of preparing vinyl chloride by reacting acetylene with hydrogen chloride in the vapor phase in the presence of a catalyst comprising as an essential component a trivalent arsenic compound in which at least one valence of the arsenic is satisfied by a beta-chlorovinyl group, the remaining valences being satisfied by chlorine, and activated charcoal as a carrier therefor, said arsenic compound being deposited upon said activated charcoal from a solution in liquid vinyl chloride.

2. The process of preparing vinyl chloride by reacting acetylene with hydrogen chloride in the vapor phase in the presence of a catalyst comprising as an essential component beta-chlorovinyl dichloroarsine, and activated charcoal as a carrier therefor, said arsenic compound being deposited upon said activated charcoal from a solution in liquid vinyl chloride.

3. The process of preparing vinyl chloride by reacting acetylene with hydrogen chloride in the vapor phase in the presence of a catalyst comprising as an essential component bis-(beta-chlorovinyl) chloroarsine, and activated charcoal as a carrier therefor, said arsenic compound being deposited upon said activated charcoal from a solution in liquid vinyl chloride.

4. The process of preparing vinyl chloride by reacting acetylene with hydrogen chloride in the vapor phase, the step which comprises carrying out the reaction in the presence of a catalyst comprising as an essential component tris-(beta-chlorovinyl) arsine, and activated charcoal as a carrier therefor, said arsenic compound being deposited upon said activated charcoal from a solution in liquid vinyl chloride.

5. The process of preparing a vinyl halide which comprises reacting acetylene with a hydrogen halide in the vapor phase in the presence of a catalyst comprising as an essential component a trivalent arsenic compound in which at least one valence of the arsenic is satisfied by a beta-halovinyl group, the remaining valences being satisfied by halogen, and a surface-active carrier therefor.

6. The process of preparing vinyl chloride by reacting acetylene with hydrogen chloride in the vapor phase in the presence of a catalyst comprising as an essential component a trivalent arsenic compound in which at least one valence of the arsenic is satisfied by a beta-chlorovinyl group, the remaining valences being satisfied by chlorine, and a surface-active carrier therefor.

JAMES A. BRALLEY.

REFERENCES CITED

The following references are of record in the file of this patent:

UNITED STATES PATENTS

| Number | Name | Date |
|---|---|---|
| 1,919,886 | Herrmann et al. | July 25, 1933 |

OTHER REFERENCES

Freidlina et al., "Comptes Rendus (Doklady) de l'Academie des Sciences de l'U. R. S. S.," vol. 26, page 61 (1940). (Copy in Div. 6.)